UNITED STATES PATENT OFFICE.

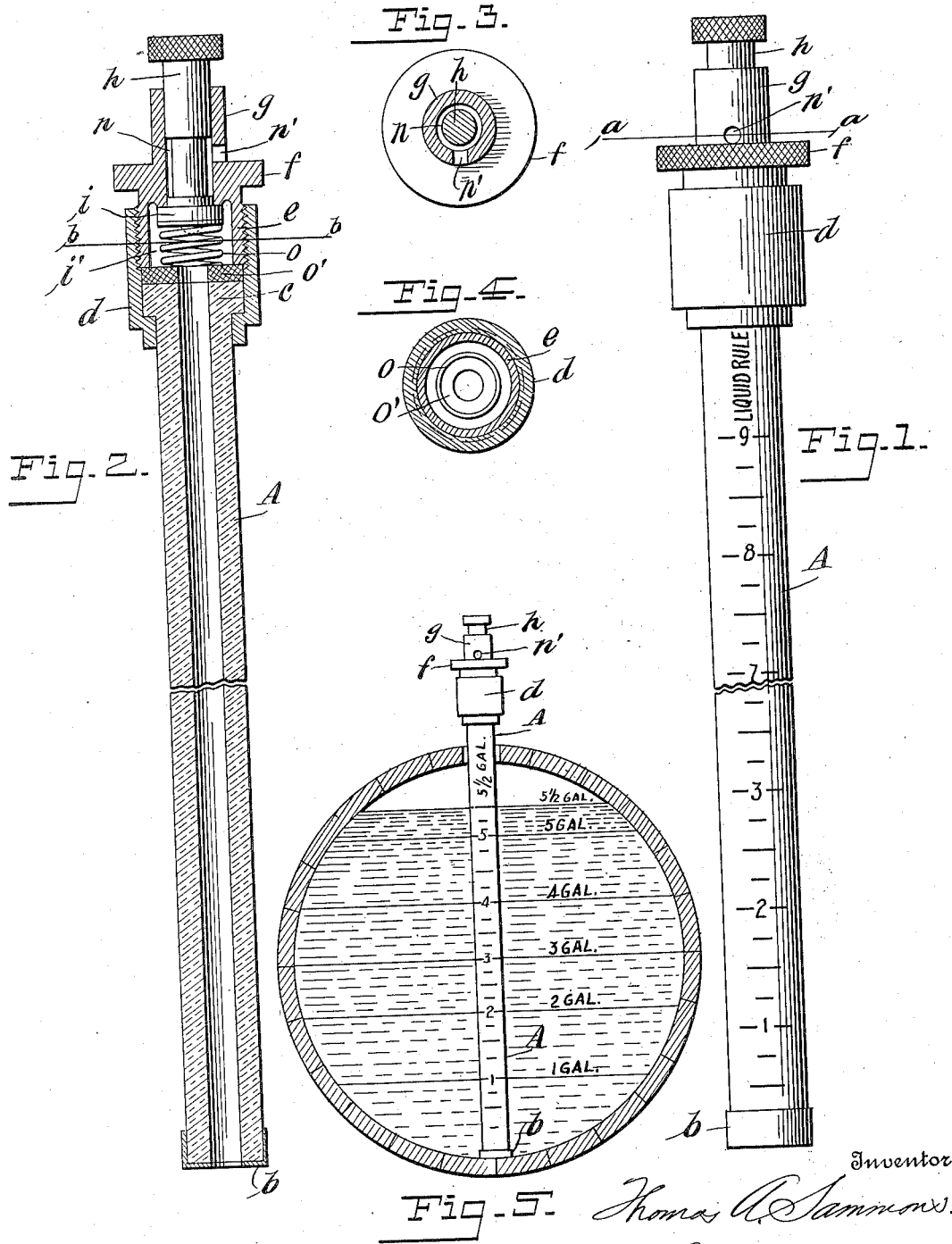

THOMAS A. SAMMONS, OF DAYTON, OHIO.

LIQUID-RULE.

1,039,816.

Specification of Letters Patent. Patented Oct. 1, 1912.

Application filed May 9, 1912. Serial No. 696,095.

*To all whom it may concern:*

Be it known that I, THOMAS A. SAMMONS, a citizen of the United States, residing at Dayton, in the county of Montgomery and State of Ohio, have invented certain new and useful Improvements in Liquid-Rules; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention which in the way of classification is given the name of liquid rule, relates to ways and means of ascertaining the correct depth of any liquid contained in barrels, kegs, jugs, etc., but more particularly to whisky, brandy, gin, etc., and in a manner more convenient and satisfactory than is possible by the uncertain method of measuring with an ordinary measuring stick such as is in common use by distillers and wholesale dealers.

The primary object of the invention is to provide the above mentioned more convenient and satisfactory means of measurement whereby the purchaser of such liquids is enabled to determine in a manner more convenient than by remeasuring in pints, quarts and gallons, whether the contents of any vessel delivered to him are the same as they were at the time of shipment from the wholesale house or distillery, understanding, of course, that the vessel had been measured by the same process at the time of shipment and the contents in inch measurement stamped thereon.

To this end, my invention consists of a hollow transparent tube, preferably glass, of any suitable length or diameter, provided on its upper end with a valve and valve box. The purpose of this valve is to control the air within the hollow tube and the operation of which, when the tube is inserted to the bottom of the vessel containing whisky, brandy, gin, etc., allows the liquid to find its way up the tube to the level of that contained in the vessel and to lift therefrom the same amount in inches as is contained in said vessel at the time of such measurement. In order to determine the contents in inches that is lifted from the vessel, the tube is provided on its outer surface with the graduated scale of a common two foot rule.

As a means of determining the contents of barrels containing whisky, brandy, gin, etc., in a manner other than by inch measurements, the tube may also be provided with a graduated scale in pints, quarts, and gallons, measuring from the bottom upward. The graduating lines in such event would indicate the amount in pints, quarts and gallons as the liquid adjusts itself to the inside dimensions of the barrel.

In order that barrels of different capacities might be measured in pints, quarts and gallons, by the same rule, a plurality of graduating scales measuring in pints, quarts and gallons can be placed upon the rule, the graduating lines of a certain scale to correspond with the inside dimensions of a certain barrel, the capacity of the barrel being marked upon the corresponding scale.

Having thus set forth the objects of my invention, I will now proceed to describe it in detail and subsequently point out in claims what I believe to be new and useful.

Referring first to the accompanying drawings which serve to illustrate the invention, Figure 1 represents a vertical longitudinal elevation of my improved liquid gage or measuring tube, a portion of the length thereof being removed. Fig. 2 is a longitudinal mid-sectional elevation of the same. Fig. 3 is a cross-section on the line $a$—$a$ of Fig. 1. Fig. 4 is a cross-section on the line $b$—$b$ of Fig. 2. Fig. 5 is a cross-sectional view of a barrel or cask as the same comes from the wholesale dealer or distiller, showing my improved liquid gage in position therein. The device as shown in this figure of the drawings, contains calibrations designed to measure the contents of a container in gallons and fractional parts thereof, while, as shown in Fig. 1, the calibrations are in inches and fractions thereof.

Referring in detail to the said drawings, $a$ designates a transparent tube, preferably constructed of a suitable quality of glass and of any desirable length, the effective length thereof being determined by the dimensions or depth of the liquid container or containers in connection with which it is designed to be used. As a means of protection, the end of the tube or gage which engages the interior surface of the container, when in operation, may be provided with a perforated metallic cap $b$ which incloses said end. The opposite or upper end of the tube terminates in a head $c$ which is inclosed by a metallic shell $d$ contracted at one end to engage the tube below the said head $c$ and held in position thereby. The larger end of said shell is interiorly screw-threaded to receive the screw-threaded extensions $e$ of a nut $f$. The nut $f$ also has a tubular extension $g$ which provides a casing in which lies the stem $h$ of a valve $i$. The said valve stem has a portion of its length reduced in diameter to provide an air passage-way $n$ around it which communicates with the atmosphere through one or more ports $n'$ in the extensions $g$. Communication between the passage-way $n$ and the chamber $i'$ is controlled by the valve. A spring $o$ engages the valve disk at one end and a gasket $o'$ at the other and causes said valve to normally close the air communication between the tube and the atmosphere. The gasket $o'$ is a packing made of suitable material such as leather.

The operation of the gage is briefly as follows: The valve is first pressed inwardly by the finger engaging the exposed head of the stem $n$, thus opening the air passage to the interior of the tube. The tube is then inserted in the vessel, the contents of which is to be measured, until the end thereof engages the interior surface of said vessel. Communication being established between the tube and the atmosphere, the liquid will rise within the tube until it attains the level of that within the vessel. The valve is then released from the finger pressure and is returned by the spring $o$ to its former closed position, thus closing the communication between the tube and the atmosphere; the tube may then be removed with its contents from the vessel. It will be found to have removed a quantity of the liquid contents of the vessel equal in length to the depth of that contained in said vessel. If the gage scale reads in inches and fractions thereof, the quantity of the liquid in the vessel will be in this manner ascertained in depth, or the gage may be scaled to read directly in gallons and fractions thereof, as in Fig. 5 when the capacity of the gage is shown to be 5½ gallons which is the capacity of the vessel. The space between the gallon marks vary in accordance with the varying widths of the vessel. Wherever the gage is made to measure the liquid in gallons or fractions thereof, each size of barrel or container requires its own individual gage as will be understood, but where the measurements are obtained indirectly, a single gage, calibrated in inches and fractions as in Fig. 1, may be utilized in connection with barrels or containers of different sizes. When the contents of a vessel have been ascertained from a reading of the scale, the valve may be opened to admit air to the tube and the contents allowed to fall back into the vessel.

Having described the construction and operation of my invention, I desire to claim, 1. A liquid gage adapted to be inserted in a container to ascertain the quantity of liquid therein, and consisting of a transparent tube provided on its outer surface with a suitable graduated scale to indicate the quantity of liquid in the container, a valve casing on the outer end of said tube providing two chambers, one of which communicates directly with the tube and the other of which communicates with the atmosphere, a valve in said casing controlling the communication between said chambers, and by means of which the liquid is permitted to enter said tube and to be retained therein.

2. The combination in a liquid rule, of a transparent tubular member provided with a scale indicating quantities of liquid in a container, said tube being enlarged in diameter at one end, a casing secured to said enlarged end, an apertured member having an air port secured to said casing and providing a valve chamber adapted to communicate with the atmosphere through said air port and with the opening in said tubular member, a valve controlling the communication between said chamber and the opening in said tubular member, a stem secured to said valve and extended through said apertured member, said stem having two diameters, adapted to open and close said air port, and a spring normally holding said valve seated, substantially as described.

In testimony whereof I affix my signature, in presence of two witnesses.

THOMAS A. SAMMONS.

Witnesses:
R. J. McCarty,
Matthew Siebler.